United States Patent [19]

Oura et al.

[11] Patent Number: 5,574,399
[45] Date of Patent: Nov. 12, 1996

[54] COHERENT PSK DETECTOR NOT REQUIRING CARRIER RECOVERY

[75] Inventors: Hideto Oura; Yuji Iguchi, both c/o Oki Electric Industry Co., Ltd. 7-12, Toranomon 1-chome, Minato-ku, Tokyo, Japan

[73] Assignees: Hideto Oura; Yuji Iguchi, both of Tokyo, Japan

[21] Appl. No.: 544,977

[22] Filed: Oct. 30, 1995

[30] Foreign Application Priority Data

Nov. 10, 1994 [JP] Japan ................................. 6-276524

[51] Int. Cl.⁶ .......................... H03D 3/00; H04L 27/233
[52] U.S. Cl. ........................ 329/306; 329/310; 375/324; 375/328; 375/329; 375/331
[58] Field of Search ................................. 329/304–306, 329/310; 375/279–284, 324, 328, 329–333

[56] References Cited

U.S. PATENT DOCUMENTS

| | | | |
|---|---|---|---|
| 5,241,567 | 8/1993 | Shimakata | 375/332 X |
| 5,313,170 | 5/1994 | Kojima | 329/310 X |
| 5,412,694 | 5/1995 | Sato et al. | 375/329 X |
| 5,426,669 | 6/1995 | Yamamoto et al. | 375/328 |
| 5,490,177 | 2/1996 | La Rosa et al. | 375/329 |
| 5,506,873 | 4/1996 | Suzuki | 375/330 X |

FOREIGN PATENT DOCUMENTS

| | | |
|---|---|---|
| 0258649 | 3/1988 | European Pat. Off. . |
| 0451289A | 10/1990 | European Pat. Off. . |
| 1-45097 | 10/1989 | Japan . |
| 2232852 | 12/1990 | United Kingdom . |

OTHER PUBLICATIONS

S. Yoshida, "A New Coherent Demodulation Technique for Land–Mobile Satellite Communications," 1990 Autumn National Meeting of the Institute of Electronics, Information, and Communication Engineers, B–169 (p. 2–169).

Y. Matsumoto et al., "A Study on pi/4-shift QPSK Coherent Detection Scheme," 1992 Autumn Meeting of the Institute of Electronics, Information, and Communication Engineers, B–241 (p. 2–244).

T. Sakata et al, "An Open Loop Coherent Detection Scheme," 1993 Autumn Meeting of The Institute of Electronics, Information, and Communication Engineers, B–300 (p. 2–300).

Y. Matsumoto et al, "a Low Power Demodulator LSIC for Personal Communication—High Performance Coherent Detection Demodulator, " Technical Report of IEICE, DSP94–18, RCS94–9 (May 1992), pp. 57–63.

Nakamura et al, U. S. patent application Serial Number 08/307,632, filed Sep. 10, 1995.

*Primary Examiner*—David Mis
*Attorney, Agent, or Firm*—Law Office of Steven M. Rabin, P.C.

[57] ABSTRACT

A coherent phase-shift keying (PSK) detector in a receiver generates an unmodulated carrier signal, without attempting to synchronize the unmodulated carrier signal in frequency or phase to the carrier employed at the PSK transmitter. The instantaneous phase of the received PSK signal is detected with reference to the unmodulated carrier signal to create an instantaneous phase signal. Phase rotation due to frequency offset between the two carrier signals is detected and removed from the instantaneous phase signal, then a remaining phase offset is detected and removed. Data are recovered from the resulting instantaneous phase signal.

16 Claims, 11 Drawing Sheets

COHERENT PSK DETECTOR NOT REQUIRING CARRIER RECOVERY

BACKGROUND OF THE INVENTION

The present invention relates to a coherent detector for demodulating a signal modulated by phase-shift keying, more particularly to a detector that operates in a slow-fading environment, does not require carrier recovery, and is suitable for large-scale integration.

Phase-shift keying (PSK) is a digital modulation system that is being increasingly adopted in mobile wireless communication systems, including microcellular automobile telephone systems and the Japanese personal handyphone system (PHS). Receiver equipment for these systems has generally employed differential detection, which is comparatively resistant to fading, but for systems operating in slow-fading environments, coherent detection has the advantage of higher sensitivity. By operating successfully at lower carrier-to-noise ratios, coherent detection can provide a greater communication range for a given transmitting power.

Conventional coherent PSK detectors employ a carrier signal recovered from and therefore synchronized with the received PSK signal, but this scheme is not without certain problems. One problem is that carrier recovery is an inherently complex process, requiring a large and expensive circuit configuration, typically one with components not suited for large-scale integration. Another problem is that the carrier recovery circuit generally includes a feedback loop with a limited response speed; this problem is particularly troublesome in communication systems that transmit in short bursts.

Attempts have been made to circumvent these problems. Some proposed systems employ differential detection to extract a tentative data signal, from which the carrier signal is generated by predictive processing. These systems avoid using a feedback loop, but the rate of differential detection errors is high, so the accuracy of carrier recovery is low, and further complex circuitry becomes necessary to protect against loss of synchronization.

Another proposed system employs a dual open loop for carrier recovery, thus using a feedforward instead of a feedback loop. Still another proposed system uses a feedback loop, but employs differential detection during initial acquisition. The carrier recovery circuits in both of these systems, however, are large and complex. There is a need for a coherent PSK detector that is not burdened with complex carrier recovery circuitry.

SUMMARY OF THE INVENTION

It is accordingly an object of the present invention to provide a coherent PSK detector that does not require carrier recovery.

Another object of the invention is to provide a coherent PSK detector that is suitable for large-scale integration.

Still another object is to provide a coherent PSK detector that can demodulate signals transmitted in bursts.

The invented coherent PSK detector has a carrier generator that generates an unmodulated carrier signal. The unmodulated carrier signal has substantially the same frequency as the transmit carrier signal modulated by the transmitter, but the unmodulated carrier signal is not locked to the transmit carrier signal in either frequency or phase. The unmodulated carrier signal is accordingly not synchronized to the input signal received by the coherent PSK detector.

In the coherent PSK detector, a phase comparator compares the input signal with the unmodulated carrier signal to obtain a first instantaneous phase signal. The first instantaneous phase signal normally includes a phase rotation due to a frequency offset between the transmit carrier signal and the unmodulated carrier signal.

A frequency offset compensation section detects this phase rotation and removes it from the first instantaneous phase signal, creating a second instantaneous phase signal. The second instantaneous phase signal is free of unintended phase rotation, but still includes a phase offset from the correct phase values.

A phase offset compensation section detects this phase offset and removes it from the second instantaneous phase signal to create a third instantaneous phase signal.

A data recovery section decides which of the correct phase values the third instantaneous phase signal represents, and decodes these values to obtain the transmitted data.

DETAILED DESCRIPTION OF THE INVENTION

An embodiment of the invention will be described with reference to the attached illustrative drawings. This embodiment assumes the use of $\pi/4$-shifted differential quadrature phase-shift keying (often referred to as $\pi/4$-shift QPSK), in which two-bit values are encoded as phase shifts in a transmit carrier signal according to Table 1. Each pair of bits is referred to as a symbol. The transmitted data are represented by the relative differences in phase from one symbol to the next.

TABLE 1

| Transmitted Data | Phase Shift (Radians) |
|---|---|
| 00 | π/4 |
| 01 | 3π/4 |
| 10 | −π/4 |
| 11 | −3π/4 |

Figure 1:
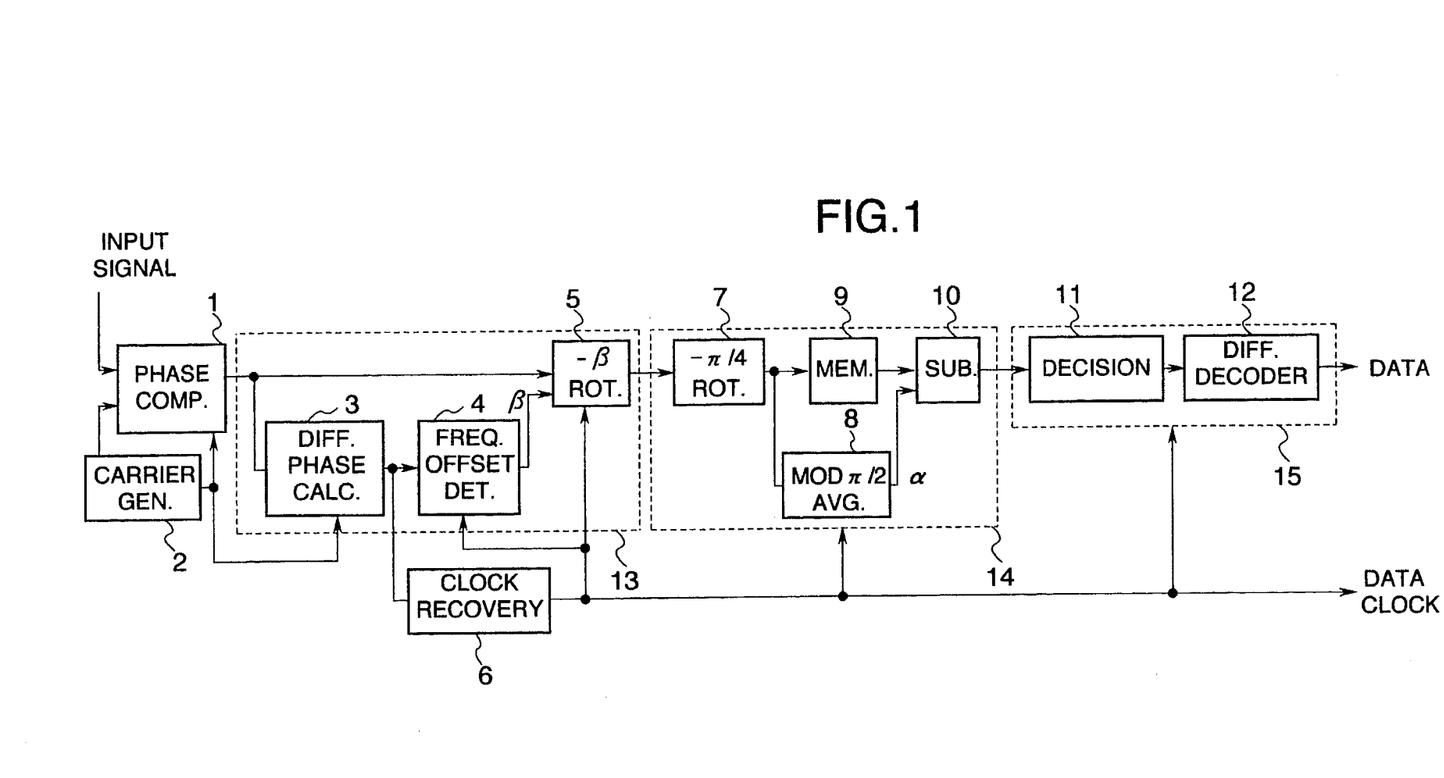
FIG. 1 is a block diagram of an embodiment of the invented coherent PSK detector.

FIG. 1 illustrates the overall configuration of the embodiment. The input signal is furnished to a phase comparator 1, together with an unmodulated carrier signal generated by a carrier generator 2. The carrier generator 2 is designed to operate at the same nominal frequency as the carrier generator in the transmitter (not shown), so the unmodulated carrier signal output by the carrier generator 2 has substantially the same frequency as the transmit carrier signal, but the unmodulated carrier signal is not recovered from the input signal, and is not synchronized in frequency or phase to the transmit carrier signal. The phase comparator 1 detects the difference in phase between the input signal and the unmodulated carrier signal, and outputs a first instantaneous phase signal corresponding to this difference.

The phase comparator 1 thus detects the instantaneous phase of the input signal as referenced to the unmodulated carrier signal. The first instantaneous phase signal may be either a digital or an analog signal.

The first instantaneous phase signal is provided to a differential phase calculator 3 and converted to a differential phase signal. From this differential phase signal, a frequency offset detector 4 detects a phase rotation β, which a first phase rotator 5 removes from the first instantaneous phase signal. The signal output from the first phase rotator 5 is a second instantaneous phase signal.

The differential phase signal output by the differential phase calculator 3 is also supplied to a clock recovery circuit 6, which generates a data clock signal. The data clock signal indicates sampling timings, and is supplied to other circuits in the coherent PSK detector, as well as to external circuits (not shown).

The second instantaneous phase signal output from the first phase rotator 5 is fed to a second phase rotator 7, where the instantaneous phase value is rotated by −π/4 per symbol. Thus adjusted, the second instantaneous phase signal is supplied to an averaging circuit 8 and memory 9. The averaging circuit 8 obtains the average value of the adjusted second instantaneous phase signal, modulo π/2, over a certain number of symbols, while the memory 9 delays the adjusted second instantaneous phase signal by a compensatory number of symbols. The averaging circuit 8 outputs a phase offset signal α, which a subtractor 10 subtracts from the delayed, adjusted second instantaneous phase signal output from the memory 9. The output of the subtractor 10 is a third instantaneous phase signal.

The third instantaneous phase signal is input to a decision circuit 11. The decision circuit 11 decides whether the value of the third instantaneous phase signal is closest to 0, π/2, π, or −90 /2, and furnishes the closest of these correct values to a differential decoder 12. The differential decoder 12 takes the difference between the outputs of the decision circuit 11 at successive symbol timings, and decodes these differences to obtain the transmitted data.

The differential phase calculator 3, frequency offset detector 4, and first phase rotator 5 constitute the frequency offset compensation section 13. The second phase rotator 7, averaging circuit 8, memory 9, and subtractor 10 constitute the phase offset compensation section 14. The decision circuit 11 and differential decoder 12 constitute the data recovery section 15.

Operation of the phase offset compensation section 14 and data recovery section 15 is synchronized with the data clock signal output by the clock recovery circuit 6. In the frequency offset compensation section 13, operation of the frequency offset detector 4 and first phase rotator 5 is also synchronized with the data clock signal. Operation of the differential phase calculator 3, and of the phase comparator 1, is synchronized with a master clock signal output by the carrier generator 2. This master clock signal is synchronized to the unmodulated carrier signal, but has a higher frequency.

Next, the general operation of the coherent detector in FIG. 1 will be described, starting with a description of the phase transitions of the input signal.

Figure 2:
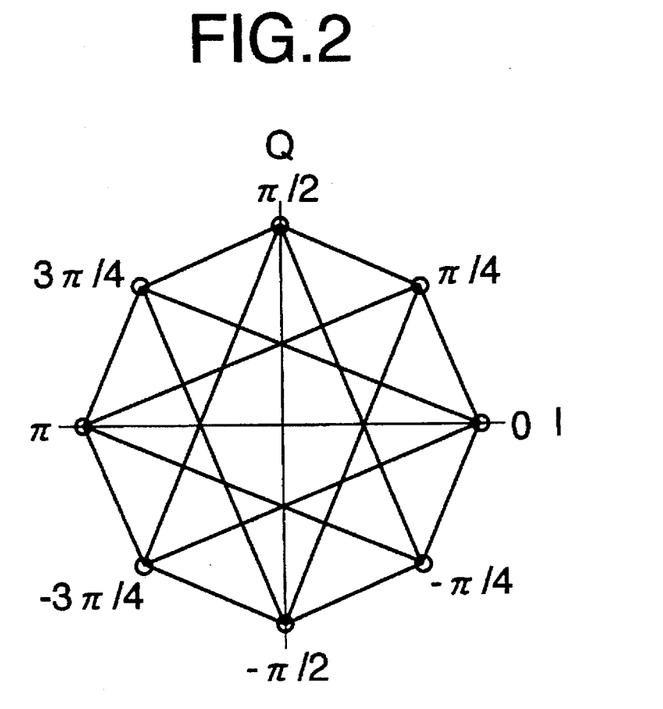
FIG. 2 illustrates phase transitions in the transmitted signal.

Modulation of the transmit carrier signal according to Table 1 produces the phase transitions indicated by straight line segments in FIG. 2. These phase transitions are shown referenced to a pair of axes designated I (in-phase) and Q (quadrature). The I and Q axes themselves do not represent phase transitions. In relation to the I and Q axes, any symbol in the transmitted signal has one of eight phase values: 0, π/4, π/2, 3π/4, π, −3π/4, −π/2, or −π/4.

The phase comparator 1 detects the phase of the input signal in relation to the unmodulated carrier signal output by the carrier generator 2. If this unmodulated carrier signal exactly matched the transmit carrier signal in frequency and were aligned in phase with the transmitter's I axis, the first instantaneous phase signal output by the phase comparator 1 would show the same transitions as in FIG. 2.

In practice, even though the transmit carrier signal and unmodulated carrier signal have the same nominal frequency, there will generally be some frequency offset between them, causing the phase of the unmodulated carrier signal to rotate at a constant rate in relation to the phase of the transmit carrier. The rotation will be clockwise or counterclockwise depending on whether the unmodulated carrier frequency is higher or lower than the transmit carrier frequency. Since the first instantaneous phase signal is referenced to the unmodulated carrier signal, it inherits a similar rotation. The rate of rotation is proportional to the size of the frequency offset. The rotation might be, for example, 10 degrees per symbol if the frequency offset is 5 kHz, 20 degrees per symbol if the frequency offset is 10 kHz, and so on.

Figure 3:
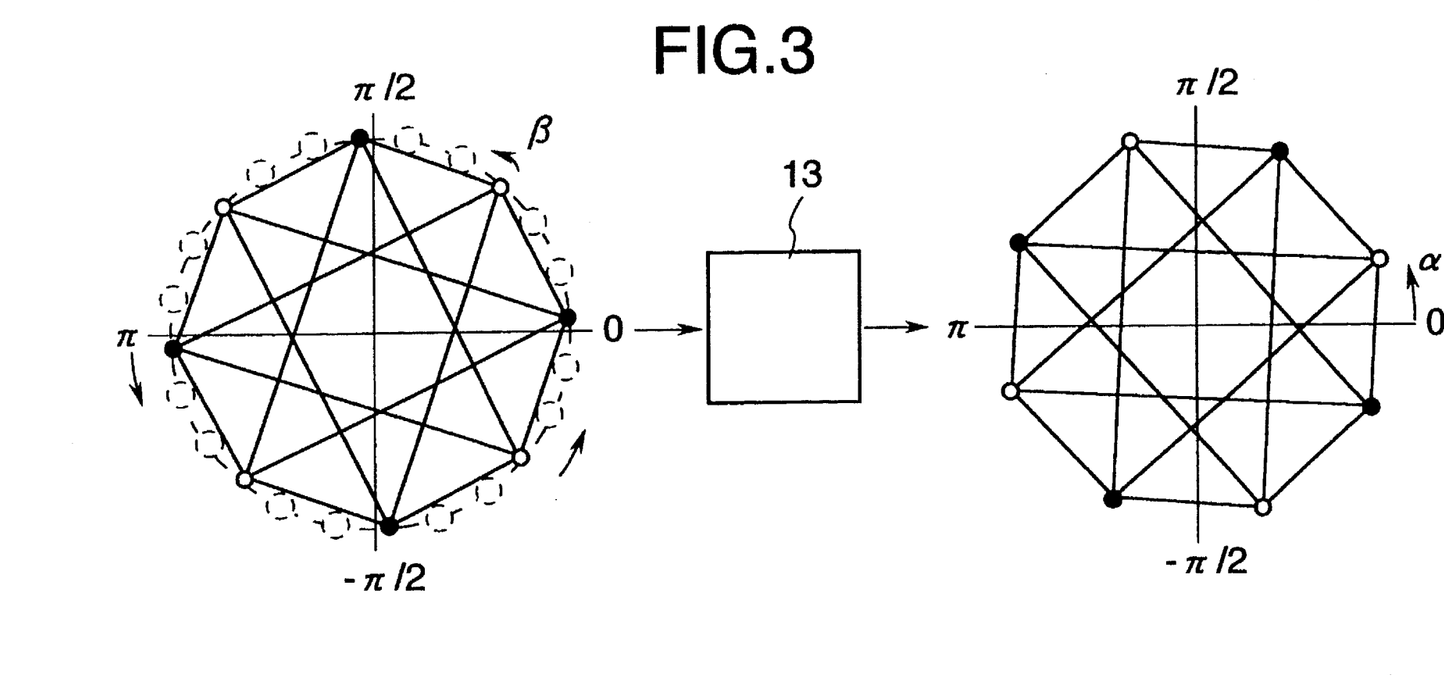
FIG. 3 illustrates the operation of the frequency offset compensation section in FIG. 1.

FIG. 3 illustrates the operation of the frequency offset compensation circuit 13. The transition pattern of the first instantaneous phase signal (shown on the left) is rotating at a rate β as described above, the rotation being indicated in the drawing by dotted lines and arrows. The frequency offset compensation circuit 13 detects this rotation and cancels it by applying an equal and opposite rotation −β, so that the transition pattern of the second instantaneous phase signal (shown on the right in FIG. 3) is stationary.

The horizontal and vertical axes in FIG. 3 are unrelated to the I and Q axes in FIG. 2; they simply indicate the values of the first and second instantaneous phase signals as output by the phase comparator 1 and first phase rotator 5. These values will be denoted by their radian equivalents. The rotation of the first instantaneous phase signal pattern may stop at any point, so the second instantaneous phase signal does not necessarily take on the correct values of 0, π/4, π/2, 3π/4, π, −3π/4, −π/2, and −π/4. The transition pattern of the second instantaneous phase signal will in general be offset from these values by a certain amount α.

Figure 4:
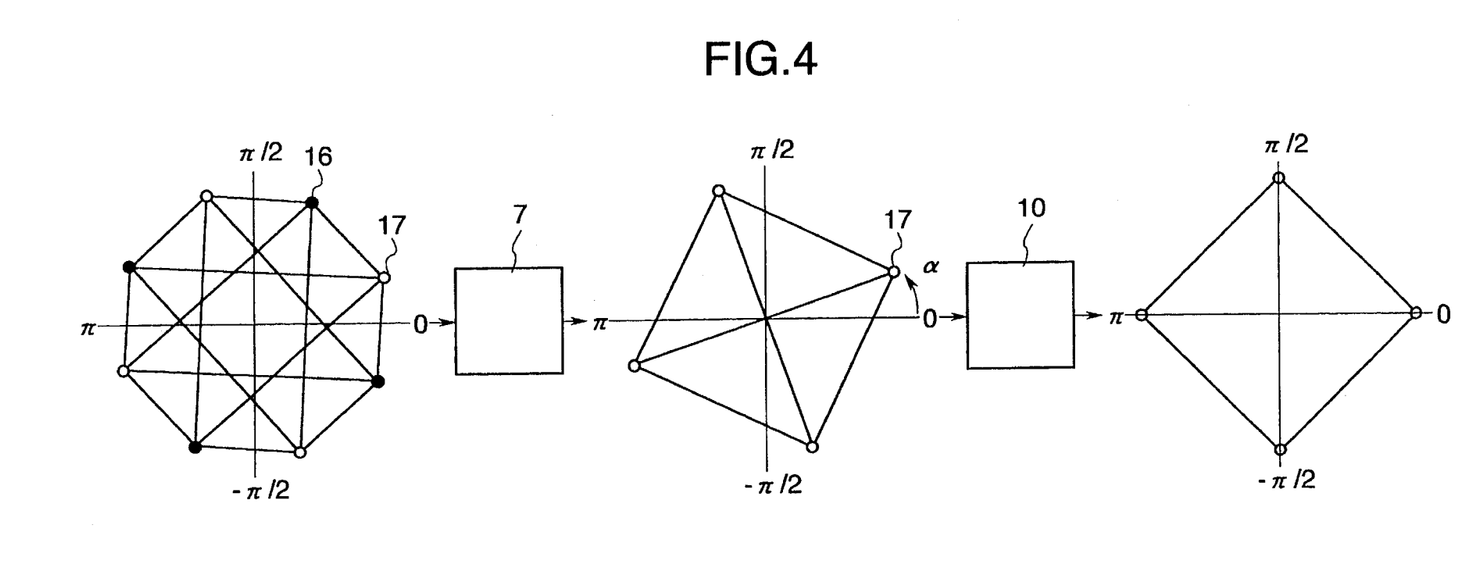
FIG. 4 illustrates the operation of the phase offset compensation section in FIG. 1.

FIG. 4 illustrates the operation of the phase offset compensation section 14. The second instantaneous phase signal is shown at the left. The eight phase positions in the transition pattern of the second instantaneous phase signal can be divided into a group of four positions indicated by block dots 16, and another group of four indicated by white dots 17. The two groups are shifted by π/4 with respect to each other. All transitions take place between the two groups.

By applying a rotational adjustment of −π/4 per symbol, the second phase rotator 7 alters the transitions so that they stay within the same group. In the drawing, the transitions stay within the group represented by white dots 17, as shown in the middle of FIG. 4. The averaging circuit 8 detects the phase offset α of this group of four positions 17 frown the four axis positions. By subtracting the offset value α, the subtractor 10 brings the values of the third instantaneous phase signal (shown at the right in FIG. 4) into alignment with the axes, so that the third instantaneous phase signal shifts among the correct values 0, π/2, π, and −π/2.

Figure 5:
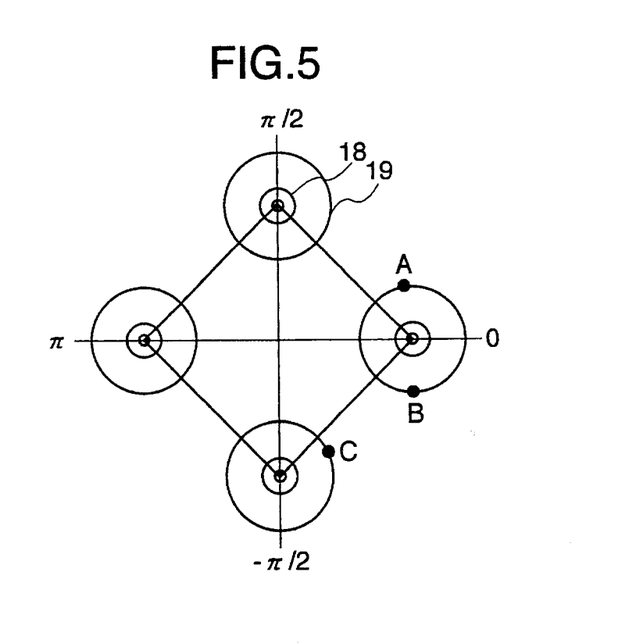
FIG. 5 illustrates the operation of the data recovery section in FIG. 1.

FIG. 5 illustrates the operation of the data recovery section 15, again showing the third instantaneous phase signal. Although the third instantaneous phase signal nominally takes on values of 0, π/2, π, and −π/2, external interference and receiver noise cause departures from these correct values. The departures are a type of white Gaussian noise, with an average size that increases as the strength of the received signal decreases. If the received signal is sufficiently strong, the third instantaneous phase signal will be close to the correct values, as indicated by the small circles 18 in FIG. 5. If the received signal is weaker, the range of variation of the third instantaneous phase signal around the correct values becomes greater, as indicated by the larger circles.

In the data recovery section 15, the decision circuit 11 assigns each symbol in the third instantaneous phase signal to the closest of the four correct values 0, π/2, π, and −π/2. Any value within the range of circle 19, for example, is assigned to π/2. The differential decoder 12 then decodes the differences between these symbol values according to Table 2.

TABLE 2

| Difference Between Symbols | Decoded Data |
| --- | --- |
| 0 | 00 |
| π/2 | 01 |
| π | 11 |
| −π/2 | 10 |

If, for example, the third instantaneous phase signal has the values A, B, and C in FIG. 5 in three consecutive symbols, the decision circuit 11 will decide that A and B represent zero radians while C represents −π/2. The differential decoder 12 will then decode the A-B transition as '00,' and the B-C transition as '10.'

Incidentally, this example illustrates the advantage of coherent over differential detection. Since B-A and C-B are both substantially equal to π/4, a differential detector would be unable to determine accurately what these two transitions represented.

Next a more detailed description of the circuit configuration and operation of several parts of the coherent PSK detector will be given.

Figure 6:
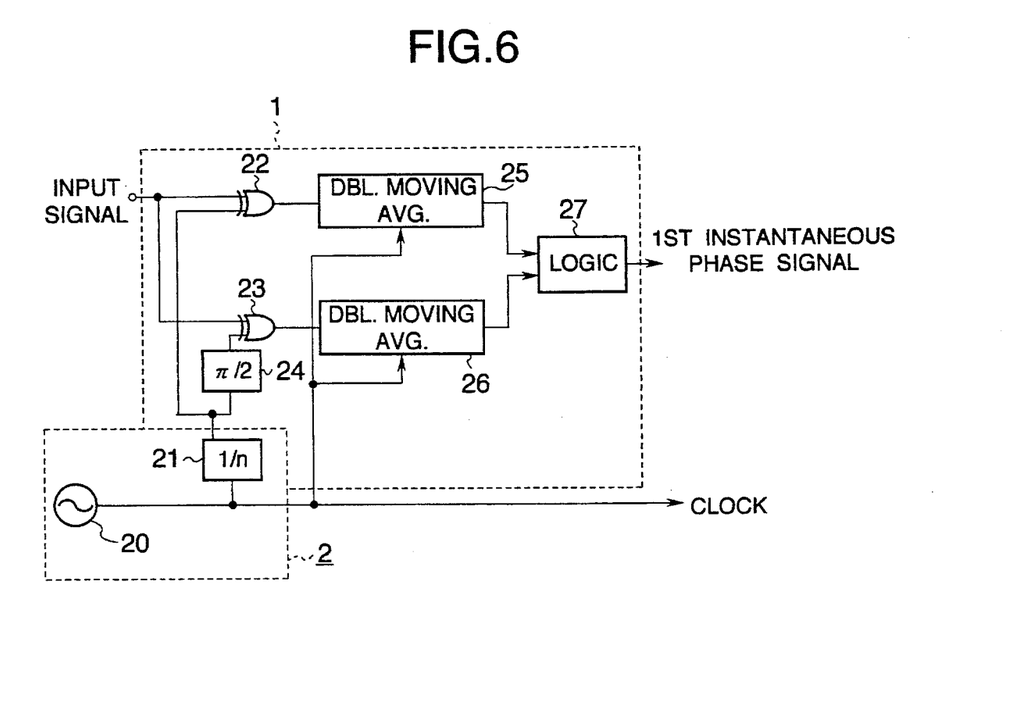
FIG. 6 illustrates an example of the circuit configuration of the phase comparator in FIG. 1.

FIG. 6 shows one preferred circuit configuration of the phase comparator 1 and carrier generator 2. The carrier generator 2 comprises a master oscillator 20 and a 1/m frequency divider 21. The clock signal output by the master oscillator 20 is the master clock supplied to the phase comparator 1 and carrier generator 2. The frequency divider 21 divides the frequency of this master clock signal by m to create the unmodulated carrier signal.

The phase comparator 1 comprises a pair of exclusive-OR gates 21 and 22, a π/2 phase shifter 24, two double-moving-average filters 25 and 26, and a polarity logic circuit 27.

The input signal is supplied to both exclusive-OR gates 22 and 23. Exclusive-OR gate 22 also receives the unmodulated carrier signal from the frequency divider 21, while exclusive-OR gate 23 receives an orthogonal carrier signal generated by the π/2 phase shifter 24 from the unmodulated carrier signal. The exclusive-OR gates 22 and 23 take the exclusive logical OR of their respective pairs of input signals and supply the resulting exclusive-OR signals to double-moving-average filters 25 and 26. The double-moving-average signals output by these double-moving-average filters 25 and 26 are combined as described later in the polarity logic circuit 27 to produce the first instantaneous phase signal.

Figure 7:
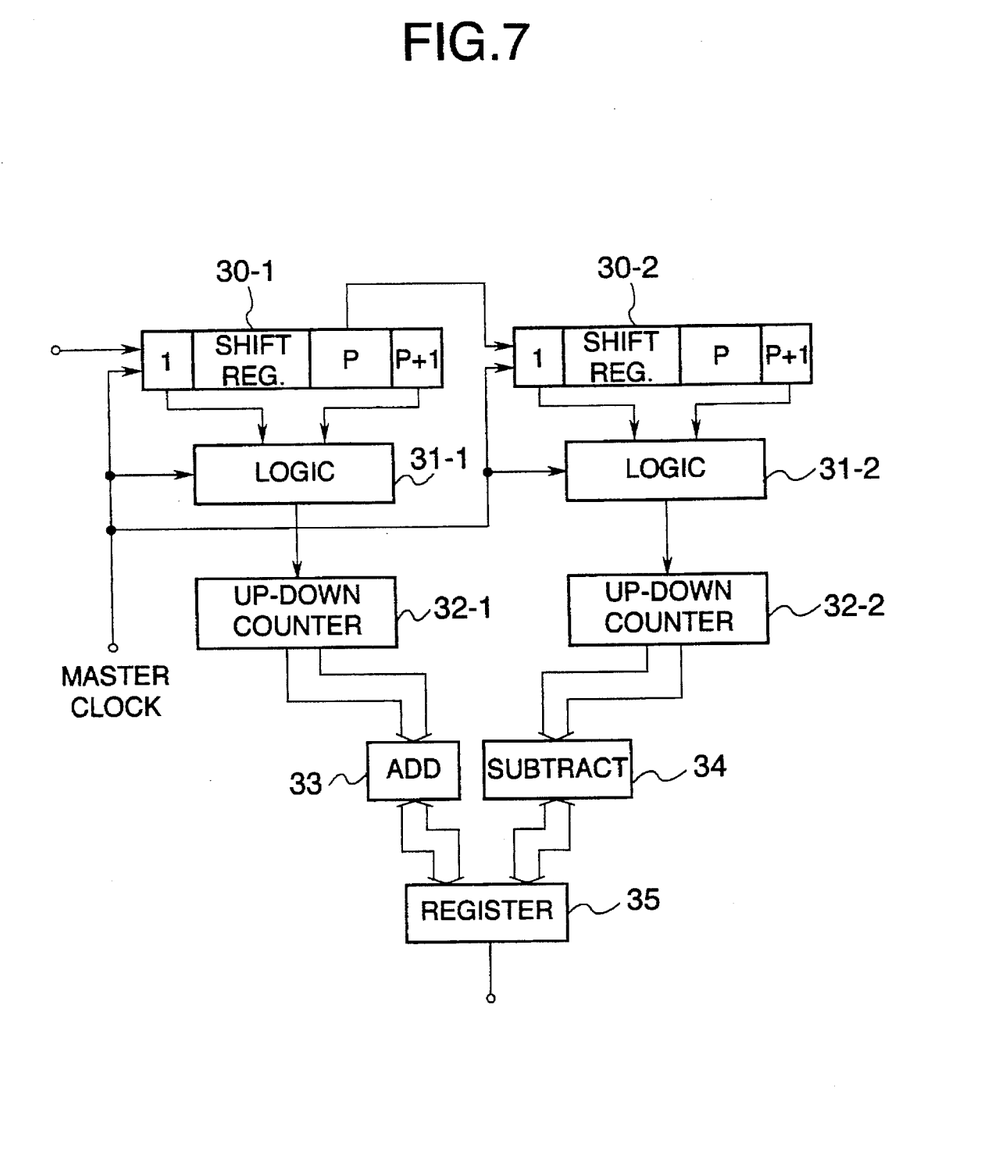
FIG. 7 illustrates an example of the circuit configuration of the double-moving-average filters in FIG. 6.

FIG. 7 shows one preferred circuit configuration of the double-moving-average filters 25 and 26. Each of these double-moving-average filters comprises a pair of (P+1)-stage shift registers 30-1 and 30-2, a pair of logic circuits 31-1 and 31-2, a pair of up-down counters 32-1 and 32-2, an adder 33, a subtractor 34, and an output register 35.

The operation of the double-moving-average filter in FIG. 7 can be described as follows. The exclusive-OR signal from the corresponding exclusive-OR gate 22 or 23 in FIG. 6 is input to the first stage of shift register 30-1 and shifted through both shift registers 30-1 and 30-2 in synchronization with the master clock signal, entering shift register 30-2 from the P-th stage of shift register 30-1.

Up-down counter 32-1 indicates the number of "ones" in the most recent P bit values of the exclusive-OR signal. Logic circuit 31-1 controls up-down counter 32-1 according to the values shifted into and out of this P-bit interval, commanding the up-down counter to increment if a "one" was shifted in and a "zero" was shifted out, to decrement if a "zero" was shifted in and a "one" was shifted out, and to leave the count unchanged when the bits shifted in and out have the same value. Up-down counter 32-1 thus maintains a moving total of the exclusive-OR signal over the most recent P master clock cycles.

Logic circuit 31-2 and up-down counter 32-2 operate similarly. The value in up-down counter 32-2 represents a moving total over an interval of P master clock cycles ending just before the start of the most recent P master clock cycles.

The output register 35 contains a moving total of these moving totals, again over an interval of P master cycles. At each master clock cycle, the value in up-down counter 32-1 is added to the moving total, and the value in up-down counter 32-2 is subtracted. The possible values in output register 35 range from zero to $P^2$. Except for a scale factor, a moving total is the same as a moving average, so the value in output register 35 represents a double moving average: a moving average of moving averages.

If the frequency of the unmodulated carrier signal is if, then the master clock frequency is mr, and the duration of P master clock cycles is P/mf. This relation can be used to select the value of P that gives a desired moving-average interval.

Figure 8:
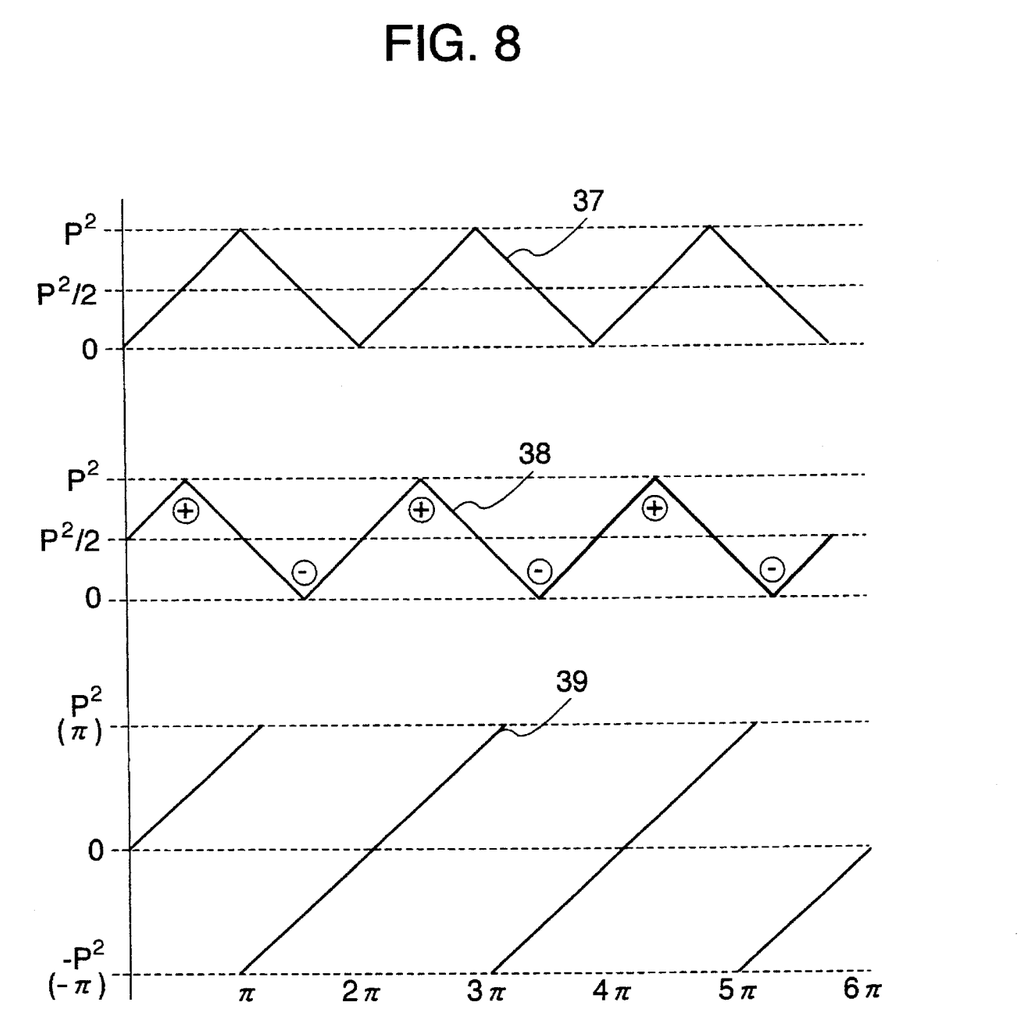
FIG. 8 illustrates the operation of the phase comparator in FIG. 6.

FIG. 8 illustrates the operation of the phase comparator 1 in FIG. 6 by showing the output 37 of double-moving-average filter 25, the output 38 of double-moving-average filter 26, and the output 39 of the polarity logic circuit 27. Signal 39 is the first instantaneous phase signal. The horizontal axis in FIG. 8 represents the phase difference between the input signal and unmodulated carrier signal. The vertical axis shows the corresponding values of output signals 37, 38, and 39 on independent scales.

The output of exclusive-OR gate 22 is always "zero" if the input signal and unmodulated carrier signal are in phase, is always "one" if the input signal and unmodulated carrier signal are out of phase by $\pi$ radians, and is a mixture of "zeros" and "ones" if the phase difference is between zero and $\pi$, the number of "ones" being proportional to the phase difference. The output signal 37 of moving-average-filter 25 varies linearly between zero and $P^2$ according to the phase difference. The output of moving-average-filter 26 is identical, but is shifted to the left by $\pi/2$, because of the $\pi/2$ phase shifter 24 in FIG. 6.

To produce the first instantaneous phase signal 39, the logic circuit 27 attaches a sign bit to the output signal 37 of moving-average-filter 25, making the sign positive or negative according to whether the output signal 38 of moving-average-filter 26 is greater than or less than its middle value of $P^2/2$. As a result, the first instantaneous phase signal 39 varies linearly from $-P^2$ to $+P^2$ over intervals of $2\pi$ (over the interval from $\pi$ to $3\pi$, for example, or from $3\pi$ to $5\pi$), and represents the signed phase of the input signal, referenced to the unmodulated carrier signal. As noted in the drawing, $P^2$ and $-P^2$ are equivalent to phase angles of $\pi$ and $-\pi$.

The first instantaneous phase signal 39 is supplied to the differential phase calculator 3 and first phase rotator 5 in FIG. 1. The differential phase calculator 3 creates the differential phase signal by delaying the first instantaneous phase signal for a time T equivalent to the duration of one symbol (the reciprocal of the baud rate of the input signal), and taking the difference between the delayed and undelayed versions of the first instantaneous phase signal. A first-in-first-out memory can be used to create the necessary delay.

Figure 9:
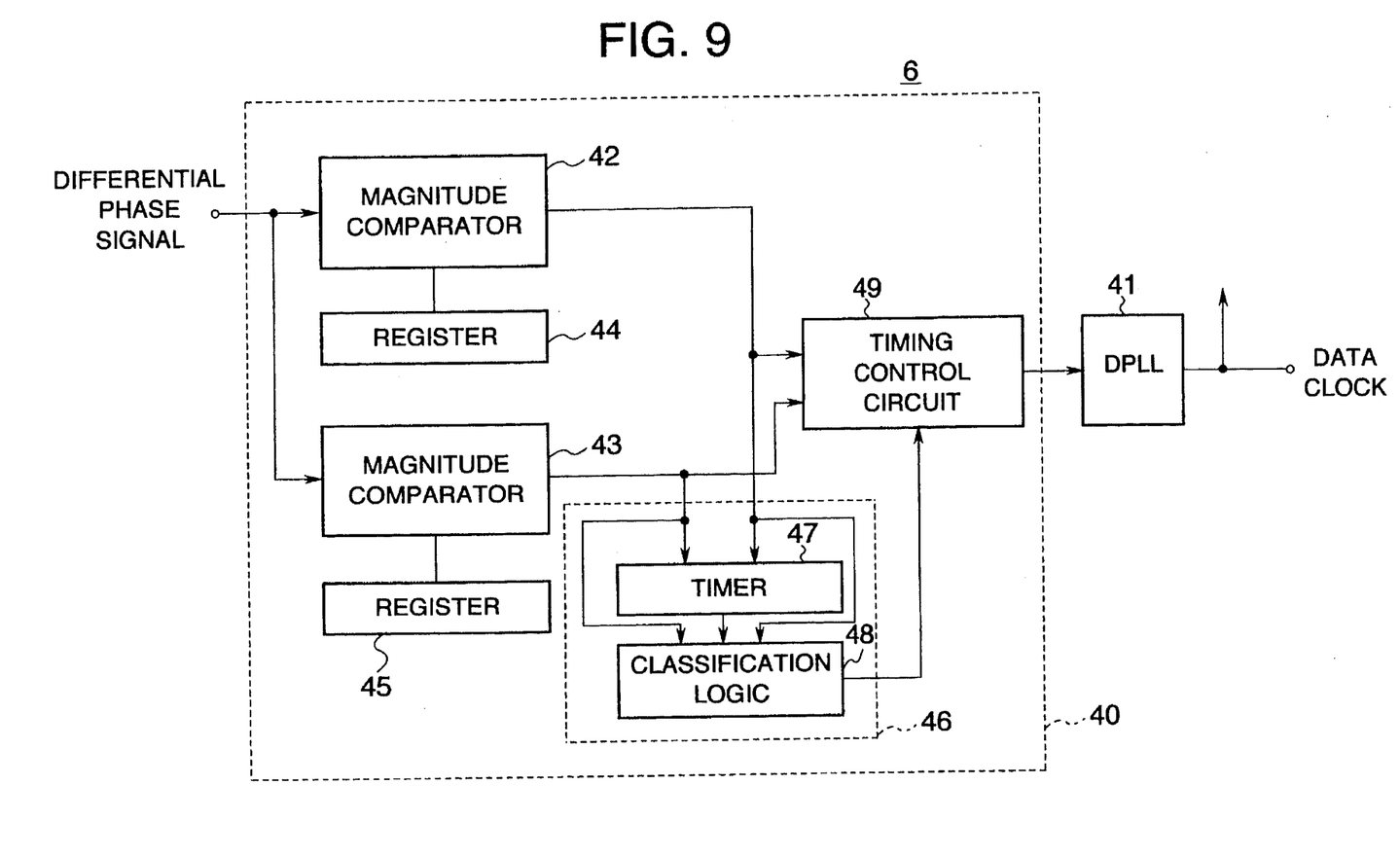
FIG. 9 illustrates an example of the circuit configuration of the clock recovery circuit in FIG. 1.

FIG. 9 shows one possible configuration of the clock recovery circuit 6. The clock recovery section 6 comprises a timing pulse generator 40 and a digital phase-locked loop (DPLL) 41. The timing pulse generator 40 receives the differential phase signal from the differential phase calculator 3, and supplies timing pulses to the DPLL 41. The DPLL 41 is a well-known circuit that generates the data clock signal, and synchronizes the phase of the data clock signal to the supplied timing pulses.

In the timing pulse generator 40, magnitude comparators 42 and 43 generate level-crossing pulses when the differential phase signal crosses levels set in a pair of registers 44 and 45. These level-crossing pulses are supplied to a trajectory classifying circuit 46 comprising a timer 47 and classification logic circuit 48, and to a timing control circuit 49. The timing control circuit 49 also receives a classification signal from the classification logic circuit 48, and outputs the timing pulses used by the DPLL 41.

The levels set in registers 44 and 45 are selected according to known properties of the input signal. Here it will be assumed that the input signal is transmitted in bursts, and that some of these bursts are synchronizing bursts having a preamble consisting of repetitions of the data "100110011001 . . . " The appropriate levels are then values corresponding to zero radians (the first level, set in register 44) and $\pi/2$ radians (the second level, set in register 45).

In the classifying circuit 46, the level-crossing pulses are received by both the timer 47 and classification logic circuit 48. The timer 47 is reset by input of either level-crossing pulse, and outputs a time-out pulse if a certain time Td elapses before input of the next level-crossing pulse. The time-out value Td should be greater than one-third and less than one-half of the symbol duration T ($T/3 < Td < T/2$).

The classification logic circuit 48 has register circuits for storing the last three pulses received from the magnitude comparators 42 and 43 and timer 47, and logic circuits for issuing classification signals according to these pulses. The classification rule is given in Table 3.

TABLE 3

| 1st Input | 2nd Input | 3rd Input | Classification | Timing Pulse Output Timing |
|---|---|---|---|---|
| Don't care | 2nd level crossing | 1st level crossing | 1 | 2nd level crossing $+ t_0 + T/2$ |
| Don't care | 1st level crossing | 2nd level crossing | 2 | 1st level crossing $+ t_0 + T/2$ |
| Time out | 1st level crossing | Time out | 3 | 1st level crossing $+ T/2$ |
| Other cases | | | None | No output |

The columns headed 1st Input, 2nd Input, and 3rd Input in Table 3 indicate the last three pulses received, the first input being the oldest and the third input the most recent. The column headed Classification indicates the type of classification signal output when the third input pulse is received.

The timing control circuit 49 has timers for measuring elapsed time, and generates timing pulses at designated delays from designated level-crossing pulses. The delay and pulse designations are made by the classification signal, as indicated by the Timing Pulse Output Timing column in Table 3. The quantity T/2 represents half the symbol duration, and $t_0$ represents, for example, one-sixth of the symbol duration ($t_0 = T/6$). Delays are measured from the timing of the pulse listed in the 2nd Input column in Table 3.

Figure 10:
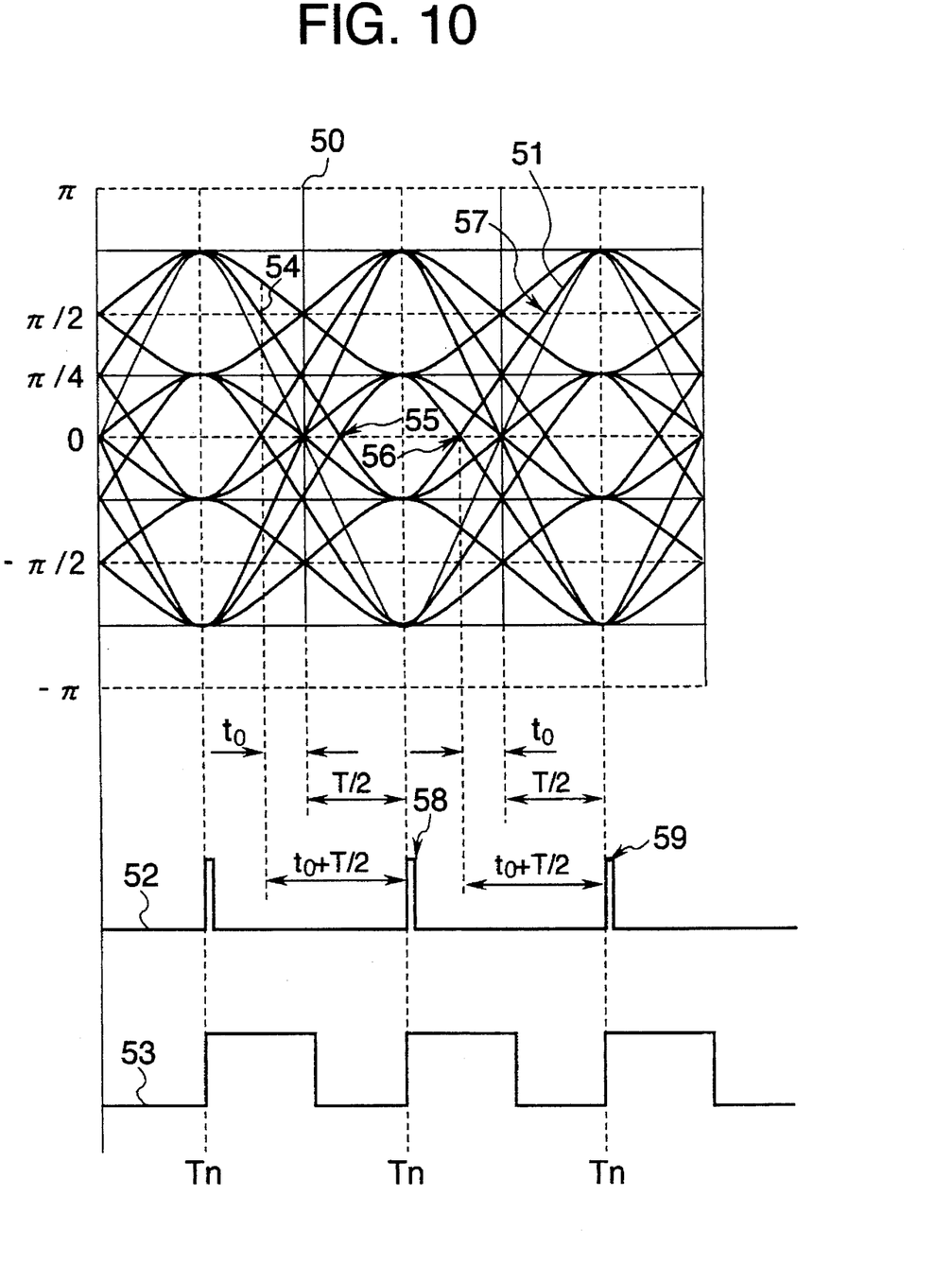
FIG. 10 illustrates the operation of the clock recovery circuit in FIG. 9.

The operation of this clock recovery circuit is illustrated in FIG. 10. For simplicity, this diagram assumes that the unmodulated carrier frequency is exactly equal to the transmit carrier frequency. The horizontal axis in FIG. 10 represents time, with vertical lines 50 indicating symbol boundaries. The vertical axis represents signal values.

Sixteen possible trajectories of the differential phase signal are shown at the top of FIG. 10, including a trajectory 51 that occurs during the above-described preamble. The timing pulses 52 output by the timing control circuit 49 are shown below these trajectories. The data clock signal 53 output by the clock recovery circuit is shown at the bottom.

Trajectory 51 crosses the second level ($\pi/2$) at point 54, crosses the first level (zero) at point 55, crosses the first level again at point 56, and crosses the second level again at point 57. The timing interval between points 54 and 55 is less than Td, so in accordance with Table 3, the crossing at point 55 causes the classification logic circuit 48 to output a classification signal, and the timing control circuit 49 to output a timing pulse 58 delayed $T/2 + t_0$ from point 54. The timing interval between points 55 and 56 is greater than Td, so no classification signal is output at point 56. The timing interval between points 56 and 57 is less than Td, so the classification logic circuit 48 outputs another classification signal at point 57, and the timing control circuit 49 outputs a timing pulse 59 delayed $T/2 + t_0$ from point 56.

Timing pulses 58 and 59 occur in the exact centers of their respective symbol intervals. As long as the preamble continues, timing pulses will continue to be generated at similar timings. The DPLL 41 can quickly capture the phase of these timing pulses and lock the data clock signal 53 so that, for example, its rising transitions occur at timings Tn synchronized with the timing pulses. These timings Tn are synchronized with the symbols in the input signal, and indicate the optimum points for sampling the differential phase signal and first instantaneous phase signal.

After the preamble ends, the differential phase signal can follow any of the sixteen trajectories shown in FIG. 10. Timing pulses are generated for eight of these sixteen trajectories. Four of those eight trajectories produce timing pulses at the exact centers of the symbol intervals, while the other four produce timing pulses with a small amount of jitter (departure from the center). These timing pulses will normally be adequate to keep the data clock signal 53 locked in synchronization with the symbol intervals.

When the unmodulated carrier frequency is not exactly equal to the transmit carrier frequency, all of the timing pulses generated by the circuit in FIG. 9 may have a certain amount of jitter, which may cause the data clock signal to become deadlocked at the wrong phase. This problem can be avoided by providing additional circuitry to detect the deadlocked state and force the data clock signal out of this state. A description of this circuitry will be omitted to avoid obscuring the invention with irrelevant detail.

Figure 11:
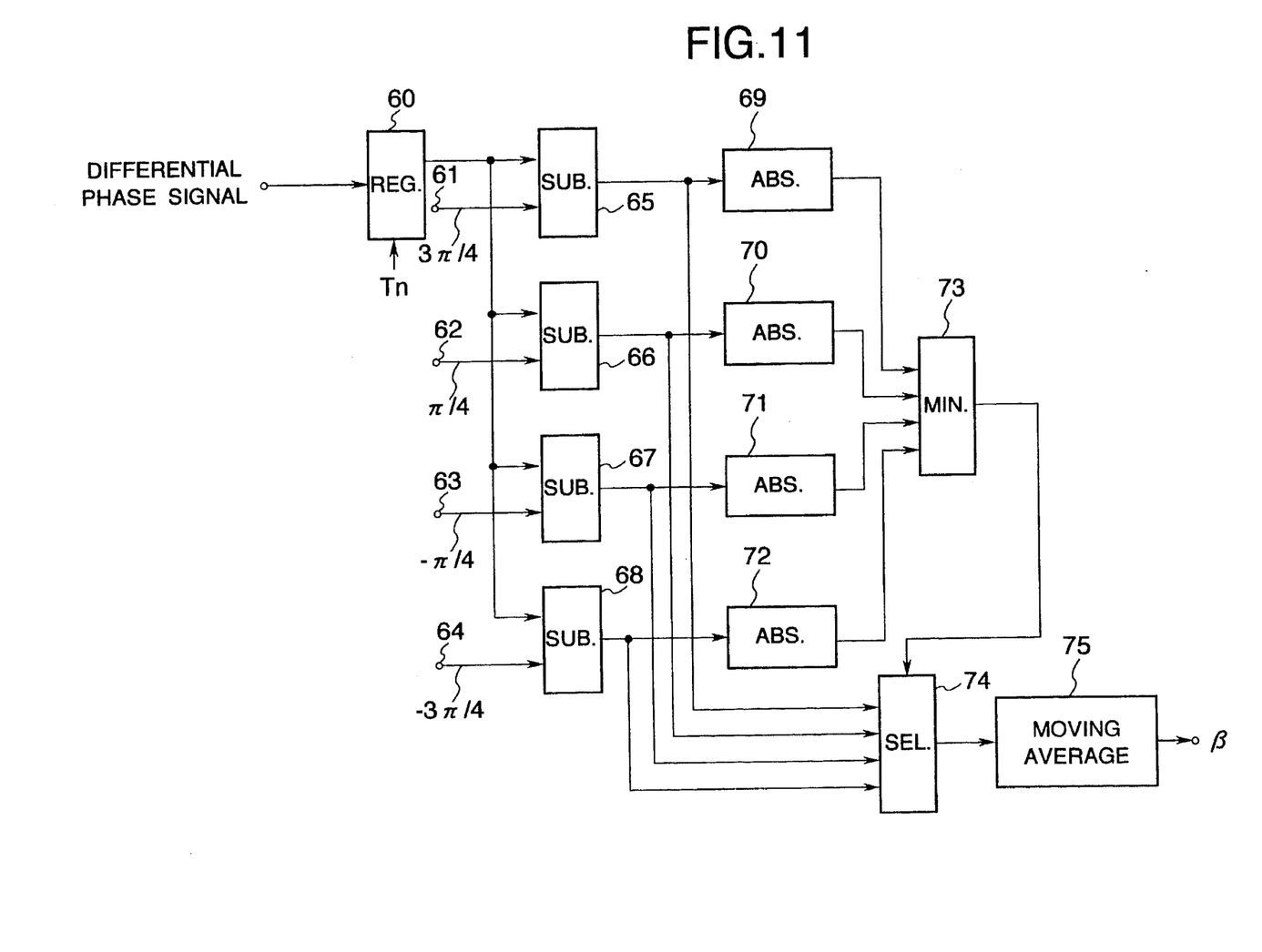
FIG. 11 illustrates an example of the circuit configuration of the frequency offset detector in FIG. 1.

FIG. 11 shows one possible circuit configuration of the frequency offset detector 4. This circuit configuration can be used when the phase rotation β caused by the frequency offset is less than π/4. In a slow-fading environment, where the Doppler shift of the carrier frequency is normally negligible, the frequency offset can reasonably be expected to be much less than π/4.

The circuit in FIG. 11 comprises an input register 60, and four more registers 61, 62, 64, and 64 that output fixed values equivalent to phase angles of 3π/4, π/4, −π/4, and −3π/4. As listed in Table 1, these are the four correct phase values which the differential phase signal would take if there were no frequency offset between the unmodulated carrier signal and transmit carrier signal. The four registers 61, 62, 64, and 64 are indicated in the drawing only by their output terminals. The frequency offset detector also comprises four subtracters 65, 66, 67, and 68, four absolute valuization circuits 69, 70, 71, and 72, a minimum detector 73, a selector 74, and a multiple-bit moving-average filter 75.

The input register 60 latches the differential phase signal at each timing Tn generated by the clock recovery circuit 6. Subtracters 65, 66, 67, and 68 obtain the differences between this signal and the correct values 3π/4, π/4, −π/4, and −3π/4. The absolute valuization circuits 69, 70, 71, and 72 convert the differences to absolute values, among which the minimum detector 73 detects the minimum absolute value. The selector 74 is controlled by the minimum detector 73 so as to select the difference having this minimum absolute value.

The multiple-bit moving-average filter 75 takes the moving average of the output of the selector 74 over a certain number of symbols. A multiple-bit moving-average filter is simply a moving-average filter that operates on input values having a data length greater than one bit. The value output by the multiple-bit moving-average filter 75 is the phase rotation β which the first phase rotator removes from the first instantaneous phase signal.

Figure 12:
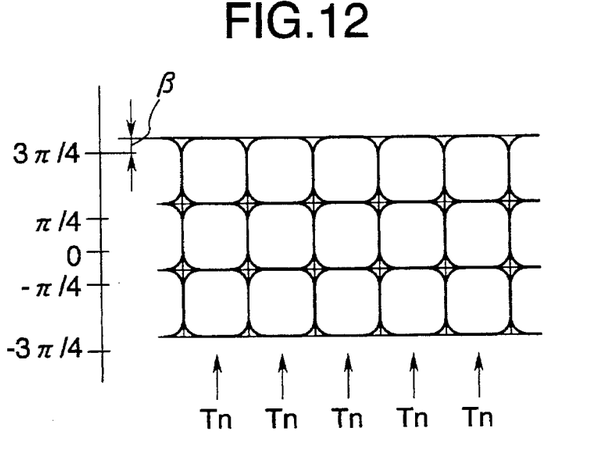
FIG. 12 illustrates an eye pattern of the differential phase signal when the unmodulated carrier frequency is lower than the transmit carrier frequency.
Figure 13:
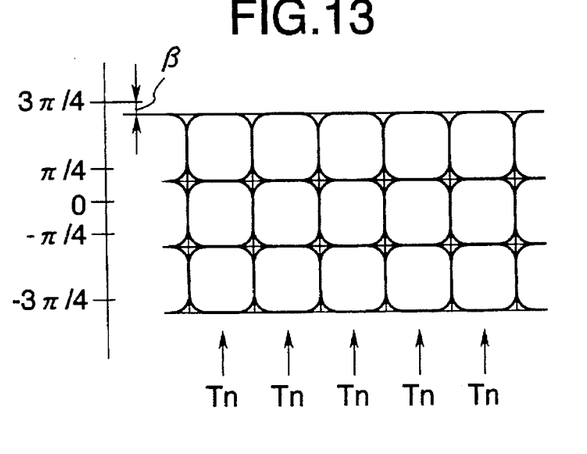
FIG. 13 illustrates an eye pattern of the differential phase signal when the unmodulated carrier frequency is higher than the transmit carrier frequency.

The operation of the circuit in FIG. 11 will be further explained with reference to FIGS. 12 and 13. FIG. 12 shows an eye pattern obtained by superimposing all possible trajectories of the differential phase signal when the transmit carrier frequency exceeds the unmodulated carrier frequency. The frequency offset shifts the eye pattern upward so that, at the timings Tn, the differential phase signal exceeds the correct values of 3π/4, π/4, −π/4, and −3π/4 by the amount β. FIG. 13 shows the same eye pattern when the unmodulated carrier frequency exceeds the transmit carrier frequency. In this case, β has a negative value and the eye pattern is shifted downward.

Referring again to FIG. 11, at each timing Tn the value β in FIG. 12 or 13 will be output from one of the four subtractors 65, 66, 67, and 68. If β is less than π/4, as assumed, then of the four outputs from the subtractors, β will be least in absolute value, and will accordingly be selected by the selector 74 and supplied to the multiple-bit moving-average filter 75.

In practice, the value supplied to the multiple-bit moving-average filter 75 will tend to vary from symbol to symbol because of noise effects, but by taking an average value over several symbols, or several tens of symbols, the multiple-bit moving-average filter 75 can accurately estimate the phase rotation.

Next the operation of the phase rotators 5 and 7 will be described with reference again to FIG. 1.

The first phase rotator 5 has an internal accumulator register (not shown in the drawing). At each timing Tn given by the data clock signal, the first phase rotator 5 adds the value β output by the frequency offset detector 4 to the contents of this accumulator register, then subtracts the resulting accumulator value from the first instantaneous phase signal and outputs the result as the second instantaneous phase signal. These addition and subtraction operations are carried out modulo 2π. Only one second instantaneous phase value is output per symbol.

The first instantaneous phase signal can be input to the first phase rotator 5 directly from the phase comparator 1, or it can be delayed to compensate for the moving-average delay and other delays in the differential phase calculator 3 and frequency offset detector 4. In a slow-fading environment the compensatory delay may be unnecessary, as the value of β changes only slowly.

The second phase rotator 7 operates similarly to the first phase rotator 5, subtracting values equivalent to π/4, 3π/4, −3π/4, and −π/4 from successive symbols in a repeating cycle.

Next the operation of the averaging circuit 8 will be described. The averaging circuit 8 takes the value of the output of the second phase rotator 7 modulo π/2. If the output of the second phase rotator 7 is suitably scaled, the modulo-π/2 operation can be performed by ignoring the most significant two bits. As can be seen from the middle pattern in FIG. 4, for every symbol, the result of this modulo-π/2 operation will be substantially equal to the phase offset α. By averaging the results of the modulo-π/2 operation over a number of symbols (several symbols, or several tens of symbols), the averaging circuit 8 obtains an accurate value of α. The averaging operation is performed in the usual way, not modulo π/2 or modulo 2π.

The operation of the other circuit elements in FIG. 1 requires no particular explanation beyond that already given.

As described above, the invented coherent PSK detector provides the same effects as if it used a carrier signal synchronized in frequency and phase with the transmit carrier signal, even though the unmodulated carrier signal actually employed is not so synchronized. The need for carrier recovery, and for a complex carrier recovery circuit, is thereby avoided. The long delay often required for initial carrier synchronization is also avoided, so the invented PSK detector is well suited for demodulating short burst signals.

As pointed out above, coherent detection is more sensitive than differential detection. In comparison with a differential PSK detector, for the same transmitting power and receiver noise figure, the invented PSK detector provides several additional decibels of receiving sensitivity, and permits reception to take place at a correspondingly greater distance.

The circuits in the drawings consist entirely of digital components, showing that the invented detector is well suited for large-scale integration. This is a particular advantage in small portable systems such as personal wireless telephones.

Next, several variations of the above embodiment will be described.

Figure 14:
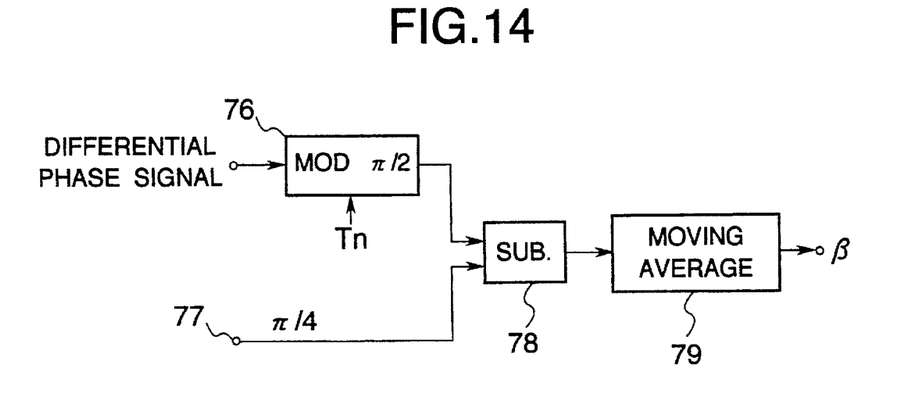
FIG. 14 illustrates an alternative circuit configuration of the frequency offset detector in FIG. 1.

FIG. 14 shows an alternative circuit configuration of the frequency offset detector 4. The differential phase signal is latched, at the above-described timings Tn, by a modulo-$\pi/2$ calculator 76. The modulo-$\pi/2$ calculator 76 obtains the value of the differential phase signal modulo a phase angle of $\pi/2$ by, for example, ignoring the most significant two bits. A register 77 (indicated only by its output terminal) supplies a constant value equivalent to a phase angle of $\pi/4$. A subtractor 78 subtracts this constant value from the output of the modulo-$\pi/2$ calculator 76. The result is identical to the output of the selector 74 in FIG. 11, and is supplied to a multiple-bit moving-average filter 79 identical to the multiple-bit moving-average filter 75 in FIG. 11. The multiple-bit moving-average filter 79 performs an ordinary moving average operation, not modulo $\pi/2$ or modulo $2\pi$, to obtain the phase-rotation value $\beta$.

The other circuit blocks in FIG. 1 also permit alternative configurations, too numerous to be described individually. The phase comparator 1, for example, may have any circuit configuration that converts the phase difference between two input signals to an analog or digital value that varies linearly over intervals of 2&P as shown in FIG. 8; many such circuits are known. Many alternative clock recovery circuits are also known.

The second phase rotator 7 in FIG. 1 can be moved to, for example, a location between the subtractor 10 and decision circuit 11. In that case the averaging circuit 8 should take the value of the second instantaneous phase signal modulo $\pi/4$ instead of modulo $\pi/2$. The second phase rotator 7 can also be located before the first phase rotator 5, or the first phase rotator 5 and second phase rotator 7 can be combined into a single phase rotator that applies a phase rotation of $-\beta-\pi/4$. The second phase rotator 7 can even be located just after the phase comparator 1, so that the $\pi/4$ phase shift is removed from the first instantaneous phase signal supplied to the differential phase calculator 3, if suitable modifications are made to the frequency offset detector 4.

The invention is not limited to use with $\pi/4$-shift QPSK modulation, but is also applicable to, for example, binary PSK, non-shifted QPSK, 8-ary PSK, and offset QPSK. The modulation need not be differential. If the modulation is not differential, the detector requires the capability or phase offset compensation throughout the full range from $-\pi$ to $\pi$, but this capability can be provided by, for example, transmitting known data at the end of the synchronization preamble.

The invention is useful not only in personal telephone systems, but in various other types of equipment employing PSK modulation. Its usefulness is not limited to wireless communications.

Those skilled in the art will recognize that still further modifications can be made without departing from the slope of the invention as claimed below.

What is claimed is:

1. A coherent PSK detector for demodulating an input signal that was produced by modulating a transmit carrier signal by phase-shift keying according to symbols derived from data, comprising:

a carrier generator for generating an unmodulated carrier signal, without synchronizing said unmodulated carrier signal to said transmit carrier signal;

a phase comparator coupled to said carrier generator, or comparing said input signal with said unmodulated carrier signal, thereby obtaining a first instantaneous phase signal referenced to said unmodulated carrier signal;

a frequency offset compensation section coupled to said phase comparator, for detecting a phase rotation in said first instantaneous phase signal due to a frequency offset between said transmit carrier signal and said unmodulated carrier signal, and removing said phase rotation from said first instantaneous phase signal, thereby obtaining a second instantaneous phase signal;

a phase offset compensation section for detecting a phase offset between said second instantaneous phase signal and certain correct phase values, and removing said phase offset from said second instantaneous phase signal, thereby obtaining a third instantaneous phase signal; and a data recovery section, for recovering said data from said third instantaneous phase signal.

2. The coherent PSK detector of claim 1, also comprising:

a clock recovery circuit coupled to said frequency offset compensation section, for recovering a data clock signal indicating timings for sampling said first instantaneous phase signal.

3. The coherent PSK detector of claim 2, wherein said frequency offset compensation section comprises:

a differential phase calculator for taking differences between values of said first instantaneous phase signal at intervals equal to one symbol duration, thereby generating a differential phase signal;

a frequency offset detector for detecting said phase rotation from said differential phase signal; and a first phase rotator for applying to said first instantaneous phase signal a rotation reverse to the phase rotation detected by said frequency offset detector.

4. The coherent PSK detector of claim 3, wherein said clock recovery circuit recovers said data clock signal from said differential phase signal.

5. The coherent PSK detector of claim 3, wherein said frequency offset detector comprises:

a plurality of subtractors for finding differences between said differential phase signal and a plurality of fixed phase angles;

a selector for selecting, from among said differences, a difference of least absolute value; and a moving-average filter for averaging the difference selected by said selector over a certain time to obtain said phase rotation.

6. The coherent PSK detector of claim 3, wherein said frequency offset detector comprises:

a modulo calculator for calculating a value of said differential phase signal modulo a first phase angle;

a first subtractor for finding a difference between the value calculated by said modulo calculator and a second phase angle; and a moving-average filter for averaging the difference found by said first subtractor over a certain time to obtain said phase rotation.

7. The coherent PSK detector of claim 1, wherein said phase offset compensation section comprises:

an averaging circuit for taking a moving average of said second instantaneous phase signal, modulo a certain phase angle, over a certain time, thereby obtaining a phase offset signal representing said phase offset;

a delay circuit for delaying said second instantaneous phase signal by a compensatory time, thereby generating a delayed instantaneous phase signal; and a second subtractor for subtracting said phase offset signal from said delayed instantaneous phase signal to obtain said third instantaneous phase signal.

8. The coherent PSK detector of claim 1, wherein said input signal is modulated by $\pi/4$-shift differential quadrature phase-shift keying.

9. The coherent PSK detector of claim 8, comprising a second phase rotator for rotating one instantaneous phase signal among said first instantaneous phase signal, said second instantaneous phase signal, and said third instantaneous phase signal at an angular rate of $-\pi/4$ per symbol.

10. A method of demodulating an input signal that was produced by modulating a transmit carrier signal by phase-shift keying according to symbols derived from data, comprising the steps of:

generating an unmodulated carrier signal substantially equal in frequency to said transmit carrier signal, but not locked to said transmit carrier signal in frequency and not hocked to said transmit carrier signal in phase;

comparing said input signal with said unmodulated carrier signal in phase, thereby generating a first instantaneous phase signal;

detecting in said first instantaneous phase signal a phase rotation due to a frequency difference between said transmit carrier signal and said unmodulated carrier signal;

removing said phase rotation from said first instantaneous phase signal, thereby obtaining a second instantaneous phase signal;

detecting in said second instantaneous phase signal a phase offset from a set of correct phase values;

subtracting said phase offset from said second instantaneous phase signal, thereby obtaining a third instantaneous phase signal;

selecting one of said correct phase values per symbol, by selecting a correct phase value closest to said third instantaneous phase signal; and decoding the correct phase values thus selected to obtain said data.

11. The method of claim 10, wherein said step of detecting a phase rotation comprises:

delaying said first instantaneous phase signal by one symbol duration, thereby obtaining a first delayed instantaneous phase signal; and comparing said first delayed instantaneous phase signal with said first instantaneous phase signal, thereby obtaining a differential phase signal.

12. The method of claim 11, comprising the further step of recovering from said differential phase signal, a data clock signal synchronized with said symbols in said input signal.

13. The method of claim 11, wherein said step of detecting a phase rotation further comprises:

comparing said differential phase signal with a set of correct phase angles, thereby obtaining a plurality of difference signals;

selecting one of said difference signals per symbol, by selecting a difference signal of least absolute value; and averaging the difference signals thus selected over a certain number of symbols.

14. The method of claim 11, wherein said step of detecting a phase rotation further comprises:

comparing said differential phase signal, modulo a first phase angle, with a second phase angle, thereby obtaining a difference signal; and averaging said difference signal over a certain number of symbols.

15. The method of claim 10, wherein said step of detecting a phase offset comprises averaging said second instantaneous phase signal, modulo a third phase angle, over a certain number of symbols.

16. The method of claim 10, wherein said input signal is modulated by $\pi/4$-shift quadrature differential phase-shift keying, comprising the further step of rotating one signal among said first instantaneous phase signal, said second instantaneous phase signal, and said third instantaneous phase signal, at a rate of $-\pi/4$ radians per symbol.

* * * * *

UNITED STATES PATENT AND TRADEMARK OFFICE
CERTIFICATE OF CORRECTION

PATENT NO. : 5,574,399
DATED : November 12, 1996
INVENTOR(S) : Hideto OURA et al.

It is certified that error appears in the above-indentified patent and that said Letters Patent is hereby corrected as shown below:

On the title page, item [73], change the name of the Assignee from "Hideto Oura, Yuji Iguchi, both of Tokyo, Japan" to --Oki Electric Industry Co., Ltd., of Tokyo, Japan--

Signed and Sealed this

Seventh Day of January, 1997

Attest:

BRUCE LEHMAN

Attesting Officer

Commissioner of Patents and Trademarks